7896X
A. TAYLOR.
Plow.
Patented Dec. 26, 1833.
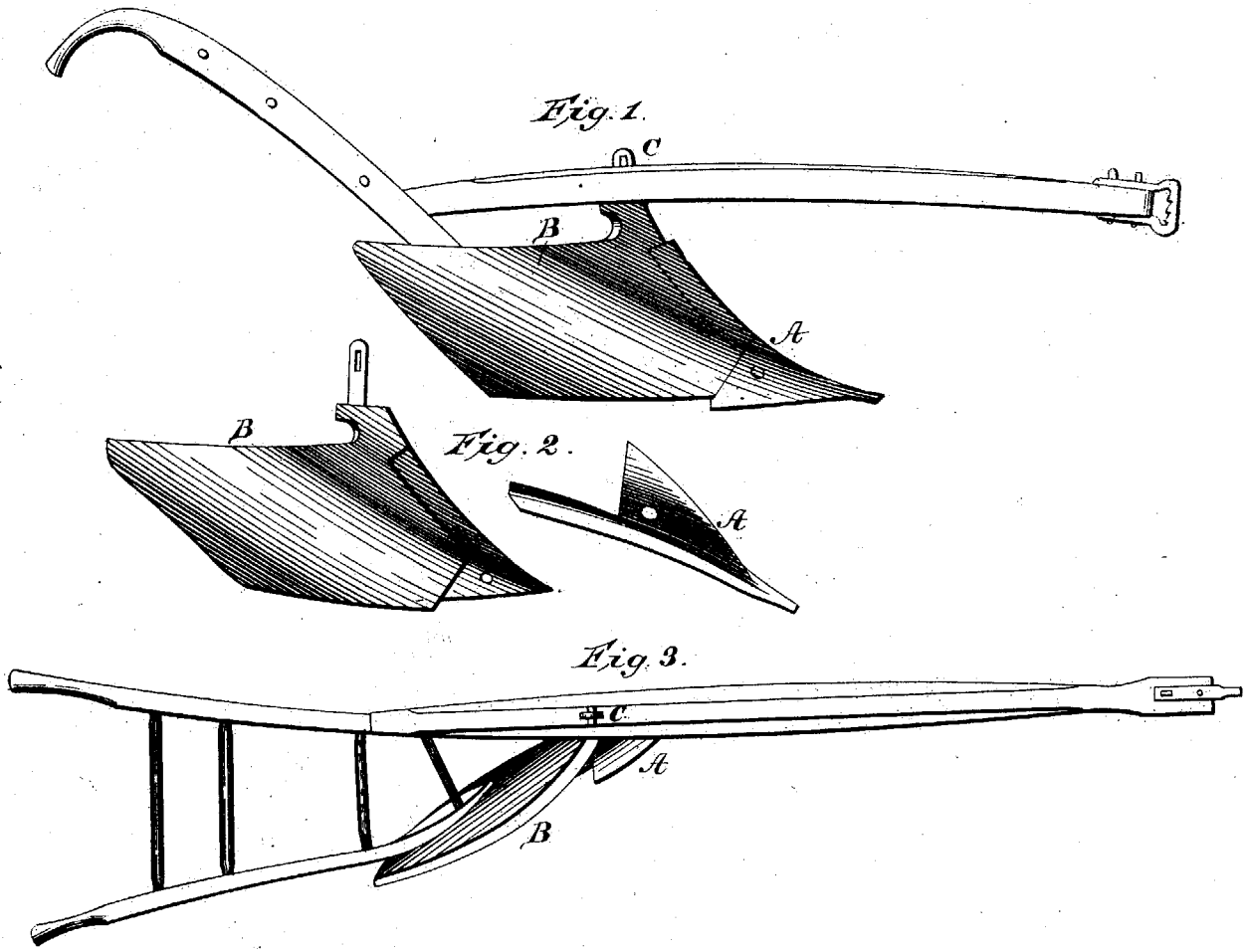
THE NATIONAL LITHOGRAPHING COMPANY,
WASHINGTON, D. C.

7896X

United States Patent Office.

ANTHONY TAYLOR, OF GREEN TOWNSHIP, STARK COUNTY, OHIO.

IMPROVEMENT IN PLOWS.

Specification forming part of Letters Patent dated December 26, 1833.

*To all whom it may concern:*

Be it known that I, ANTHONY TAYLOR, of Green township, Stark county, State of Ohio, have invented an Improvement in Cast-Iron Plows, of which the following is a specification.

The particular improvements to the cast-iron plow which I claim as my own invention consist, first, in this: The colter, instead of being a separated piece or attached to the mold-board, forms a part of the share, which is joined to the upper surface of the mold-board, rather than the nether, as the others, permitting the part that forms the colter to rest about one-third its base upon the mold-board, the upper edge of the share bedded into the mold-board, so that they present an even surface to the furrow, the share and colter fastened to the mold-board by means of a screw that passes through the share and mold-board and tightens underneath by means of a nut; second, the horizontal surface of the mold-board is nearly spherical instead of being straight, the advantage of which is it operates with the colter to facilitate the breaking of the turf; third, the left side of the mold-board is continued up, forming the bolt that passes through the beam of the plow, having a shoulder to give the beam a permanent rest; fourth, the front surface of the mold-board from the angle of the share and colter to the rear point has no concavity, as the plows of which this is an improvement, but is straight, entering the ground upon the principle of the inclined plane.

All the above-specified improvements I allege to be my own invention.

ANTHONY TAYLOR.

Witnesses:
JOSEPH J. BROOKS,
WILLIAM CALLIHAN.